US008958179B1

(12) United States Patent
Ueha et al.

(10) Patent No.: US 8,958,179 B1
(45) Date of Patent: Feb. 17, 2015

(54) MANAGING RESONANCE FREQUENCY OF HARD DISK DRIVE VOICE COIL MOTOR (71) Applicant: HGST Netherlands B.V., Amsterdam (NL)

(72) Inventors: Michio Ueha, Ebina (JP); Takeshi Saito, Hiratsuka (JP); Kohji Takahashi, Yamato (JP); Hiroki Kitahori, Fujisawa (JP)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/149,258

(22) Filed: Jan. 7, 2014

(51) Int. Cl.
*G11B 17/00* (2006.01)

(52) U.S. Cl.
USPC ...................................... 360/266.4

(58) Field of Classification Search
USPC ...................................... 360/266.4
See application file for complete search history.

(56) References Cited

U.S. PATENT DOCUMENTS

| | | | | |
|---|---|---|---|---|
| 5,822,156 | A * | 10/1998 | Suzuki et al. | 360/264.9 |
| 5,963,398 | A * | 10/1999 | Tohkairin | 360/264.7 |
| 5,999,374 | A * | 12/1999 | Kim | 360/264.7 |
| 6,091,579 | A * | 7/2000 | Suzuki | 360/264.8 |
| 6,608,732 | B2 * | 8/2003 | Bernett et al. | 360/99.16 |
| 6,724,566 | B2 | 4/2004 | Kant et al. | |
| 6,912,105 | B1 * | 6/2005 | Morita et al. | 360/99.2 |
| 6,952,323 | B2 | 10/2005 | Hirasaka et al. | |
| 7,274,119 | B2 * | 9/2007 | Ogawa | 310/12.08 |
| 7,289,301 | B2 | 10/2007 | Kim et al. | |
| 7,375,928 | B2 * | 5/2008 | Kim | 360/256.3 |
| 7,587,808 | B2 * | 9/2009 | Kim et al. | 29/603.03 |
| 7,609,484 | B2 * | 10/2009 | Iwahara | 360/264.8 |
| 7,852,602 | B2 * | 12/2010 | Suwa et al. | 360/97.13 |
| 8,305,714 | B2 | 11/2012 | Suzuki et al. | |
| 2012/0162826 | A1 | 6/2012 | Sudo et al. | |

OTHER PUBLICATIONS

Blount, Walker C., "Noise Reduction Using Dampening in Voice Coil Motors/Actuators of Hard Disk Drives", Oct. 2001, 6 pp., IBM Storage Technology, San Jose, California, URL: https://www2.hgst.com/hdd/library/noise.pdf.

Hitachi Corporation, "VCM Yoke Structure for HDD", ip.com, an IP.com Prior Art Database Technical Disclosure, IP.com No. IPCOM000226609D, Apr. 19, 2013, 22 pp., URL: http://ip.com/IPCOM/000226609.

* cited by examiner

*Primary Examiner* — Mark Blouin
(74) *Attorney, Agent, or Firm* — John D. Henkhaus (57) ABSTRACT

Approaches to reducing the natural frequency of a voice coil motor (VCM) in a hard disk drive include configuring one or both of the yokes with at least one mating structure that comprises a step feature that partitions the mating structure into a contact surface and a recessed surface, where the contact surface is toward the outer area of the mating structure and contacts a corresponding mating structure of the other yoke and the recessed surface is toward the inner area of the mating structure and does not contact with the corresponding mating structure of the other yoke. Consequently, the distance between the fixed points is increased, which reduces the natural frequency and thus the resonance of the VCM assembly.

20 Claims, 6 Drawing Sheets

MANAGING RESONANCE FREQUENCY OF HARD DISK DRIVE VOICE COIL MOTOR

FIELD OF THE INVENTION

Embodiments of the invention relate generally to hard disk drives and more particularly to improving resonance in a voice coil motor.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read/write head that is positioned over a specific location of a disk by an actuator.

A read/write head uses a magnetic field to read data from and write data to the surface of a magnetic-recording disk. Write heads make use of the electricity flowing through a coil, which produces a magnetic field. Electrical pulses are sent to the write head, with different patterns of positive and negative currents. The current in the coil of the write head induces a magnetic field across the gap between the head and the magnetic disk, which in turn magnetizes a small area on the recording medium.

Increasing areal density (a measure of the quantity of information bits that can be stored on a given area of disk surface) is one of the ever-present holy grails of hard disk drive design evolution. In turn, as recording tracks in HDDs become narrower and narrower, there is a need for more accurate and sustainable head positioning. The natural frequency of components that make up an HDD is determined by the materials used and the shapes thereof. If the natural frequency of the components is the same or similar, there are problems in terms of increased vibration due to resonance. This resonance-induced vibration affects read/write operations and, therefore, the resonance of each component is often designed so as not to be the same or similar.

SUMMARY OF EMBODIMENTS

Embodiments of the invention are directed to reducing the natural frequency of a voice coil motor (VCM) in a hard disk drive (HDD). An HDD VCM is typically configured with upper and lower yokes that are coupled together, and to which respective magnets are attached. A current-carrying coil attached to an actuator arm is positioned between the magnets and drives the movement of the head stack assembly and, therefore, the placement of the read/write head over the disk.

According to embodiments, one or both of the yokes has at least one mating structure that comprises a step feature that configures the mating structure into a contact surface and a recessed surface, where the contact surface is toward the outer area of the mating structure and contacts a corresponding mating structure of the other yoke and the recessed surface is toward the inner area of the mating structure and does not contact with the corresponding mating structure of the other yoke. Consequently, the distance between the fixed points of the yoke-yoke assembly is increased, which reduces the natural frequency and thus the resonance of the VCM assembly.

Embodiments discussed in the Summary of Embodiments section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION

Approaches to managing and reducing the frequency of a voice coil motor actuator are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

PHYSICAL DESCRIPTION OF ILLUSTRATIVE EMBODIMENTS OF THE INVENTION

Figure 1:
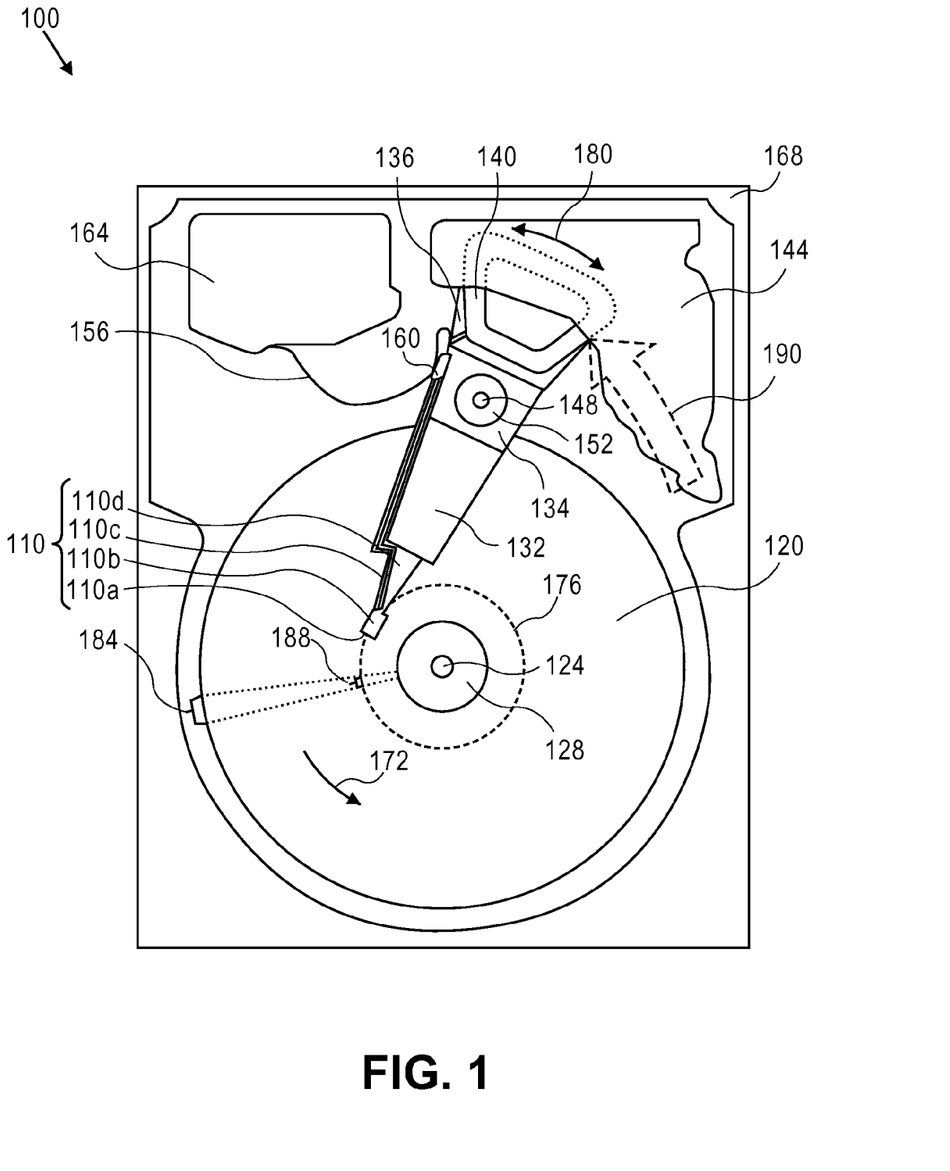
FIG. 1 is a plan view illustrating a hard disk drive, according to an embodiment of the invention.

Embodiments of the invention may be used in the context of reducing the natural frequency of a voice coil motor actuator in a hard disk drive (HDD). Thus, a plan view illustrating an HDD 100 is shown in FIG. 1. FIG. 1 illustrates an example of the functional arrangement of components of the HDD including a slider 110*b* that includes a magnetic-reading/recording head 110*a*. Collectively, slider 110*b* and head 110*a* may be referred to as a head slider. The HDD 100 includes at least one head gimbal assembly (HGA) 110 including the head slider, a lead suspension 110*c* attached to the head slider, and a load beam 110*d* attached to the lead suspension 110*c*. The HDD 100 also includes at least one magnetic-recording media 120 rotatably mounted on a spindle 124 and a drive motor attached to the spindle 124 for rotating the media 120. The head 110*a* includes a write element and a read element for respectively writing and reading information stored on the media 120 of the HDD 100. The media 120 or a plurality of disks may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet. The armature 136 of the VCM is attached to the carriage 134 and is configured to move the arm 132 and the HGA 110 to access portions of the media 120 being mounted on a pivot-shaft 148 with an interposed pivot-bearing assembly 152. In the case of an HDD having multiple disks, or platters as disks are sometimes referred to in the art, the carriage 134 is called an "E-block," or comb, because the carriage is arranged to carry a ganged array of arms that gives it the appearance of a comb.

An assembly comprising a head gimbal assembly (e.g., HGA 110) including a suspension flexure to which the head slider is coupled, an actuator arm (e.g., arm 132) to which the suspension is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components, such as a suspension tail. Generally, an HSA is the assembly configured to move the head slider to access portions of the media 120 (e.g., magnetic-recording disks) for read and write operations.

With further reference to FIG. 1, in accordance with an embodiment of the present invention, electrical signals, for example, current to the voice coil 140 of the VCM, write signal to and read signal from the head 110a, are provided by a flexible interconnect cable 156 ("flex cable"). Interconnection between the flex cable 156 and the head 110a may be provided by an arm-electronics (AE) module 160, which may have an on-board pre-amplifier for the read signal, as well as other read-channel and write-channel electronic components. The AE 160 may be attached to the carriage 134 as shown. The flex cable 156 is coupled to an electrical-connector block 164, which provides electrical communication through electrical feedthroughs provided by an HDD housing 168. The HDD housing 168, also referred to as a casting, depending upon whether the HDD housing is cast, in conjunction with an HDD cover provides a sealed, protective enclosure for the information storage components of the HDD 100.

With further reference to FIG. 1, in accordance with an embodiment of the present invention, other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the media 120 that is affixed to the spindle 124 by the disk clamp 128; as a result, the media 120 spins in a direction 172. The spinning media 120 creates a cushion of air that acts as an air-bearing on which the air-bearing surface (ABS) of the slider 110b rides so that the slider 110b flies above the surface of the media 120 without making contact with a thin magnetic-recording medium in which information is recorded.

The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the media 120. Information is stored on the media 120 in a plurality of stacked tracks arranged in sectors on the media 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

INTRODUCTION

The functional components of a voice coil motor (VCM) are a magnet and a yoke. Conventionally, if resonance becomes a problem in a VCM, the means for controlling this involves varying the thickness of the components. Alternatively, it is possible to control the resonance of the VCM by varying the yoke beam length, i.e., the distance between fixed ends of the yoke.

However, an HDD is a device having a structure in which a large number of components are mounted inside a small space. Thus, there is a limit to reducing the size of each component due to its respective functionality. Furthermore, there are various physical constraints in terms of positioning the components and these positions cannot be easily varied. Based on the foregoing, controlling resonance in a VCM in a limited space is challenging but desirable.

Voice Coil Motor Having Stepped Yoke

Figure 2:
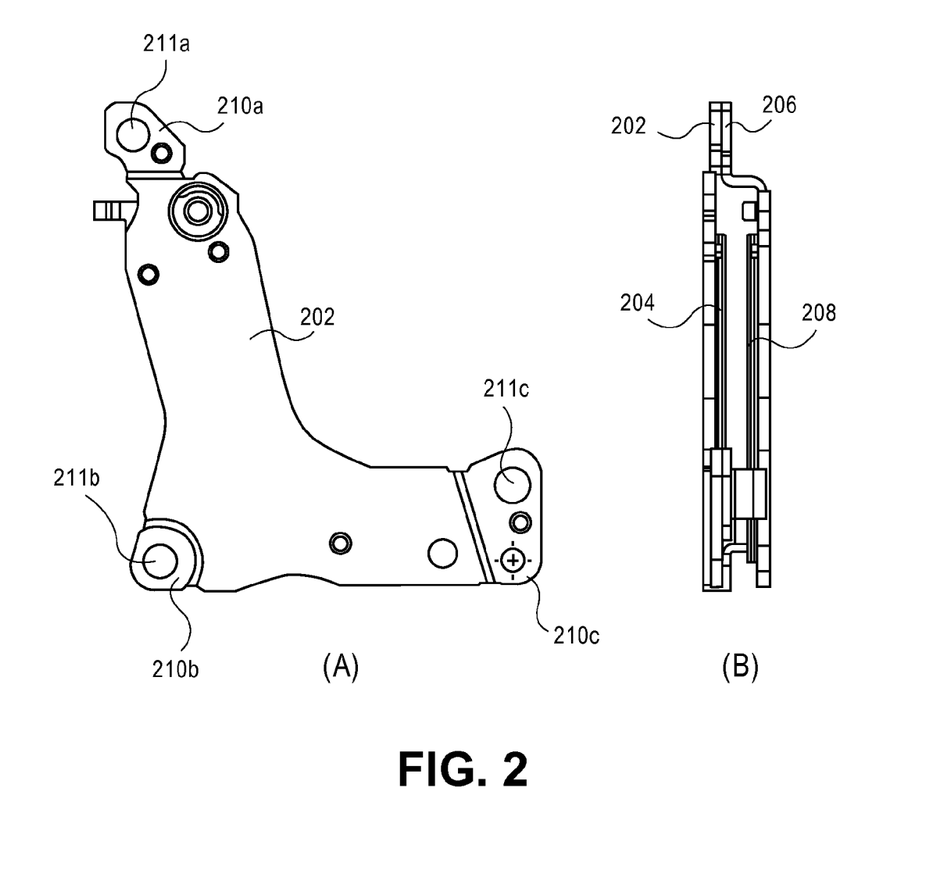
FIG. 2 is (A) a plan view and (B) a side view illustrating a voice coil motor (VCM), according to an embodiment of the invention.

FIG. 2 is (A) a plan view and (B) a side view illustrating a voice coil motor (VCM), according to an embodiment of the invention. VCM 200 comprises an upper yoke 202, to which an upper magnet 204 is attached, and a lower yoke 206, to which a lower magnet 208 is attached. Using upper yoke 202 for explanation purposes, upper yoke 202 comprises a plurality of mating structures 210a, 210b, 210c, where each mating structure comprises a respective fastener hole 211a, 211b, 211c. Similarly, lower yoke 206 comprises a plurality of mating structures (see, e.g., FIG. 3B) for use in mating, coupling or attaching lower yoke 206 with upper yoke 202. Each of the components of VCM 200 have a respective natural frequency, as does the VCM 200 assembly of upper yoke 202, upper magnet 204, lower yoke 206, and lower magnet 208.

Figure 3A:
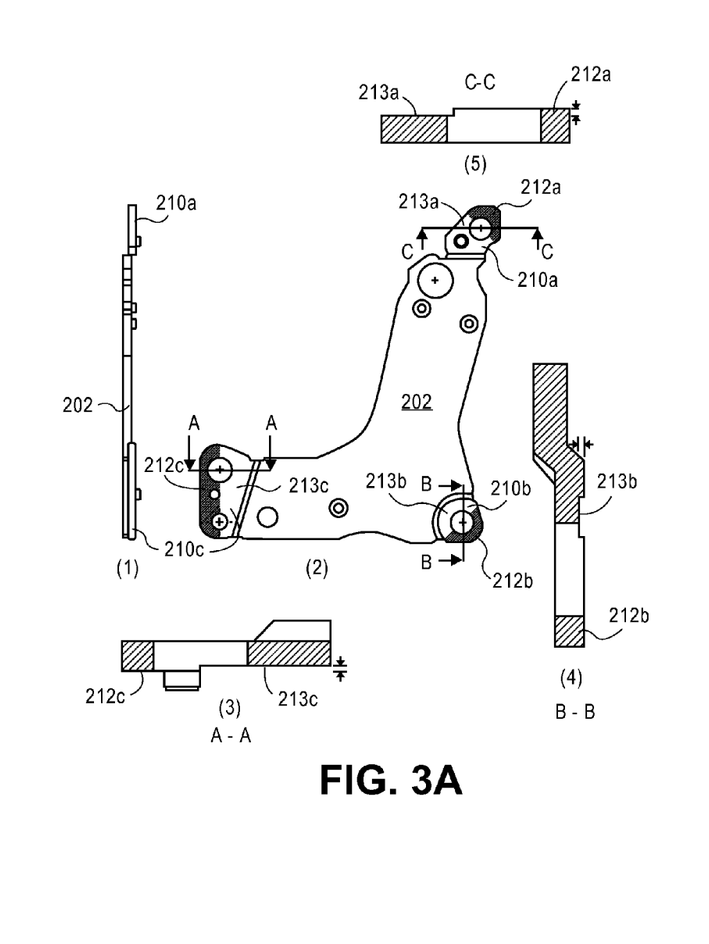
FIG. 3A is (1) a side view, (2) a bottom view, and (3-5) cutaway views illustrating an upper yoke of a. VCM, according to an embodiment of the invention.

FIG. 3A is (1) a side view, (2) a bottom view, and (3-5) cutaway views illustrating an upper yoke of a VCM, such as upper yoke 202 (FIG. 2), according to an embodiment of the invention.

Collectively, FIG. 3A(1) and FIG. 3A(2) depict upper yoke 202 comprising a plurality of mating structures 10a, 210b, 210c. The number of mating structures constituent to upper yoke 202 may vary from implementation to implementation. According to embodiments, at least one of mating structure 210a, 210, 210c, and possibly each mating structure 210a, 210b, 210c (as depicted), comprises a step feature that configures the respective mating structure with a contact surface and a recessed surface that is recessed, or offset, from the plane of the contact surface. For example, if mating structure 210a comprises the step feature, then mating structure 210a comprises a contact surface 212a (dark area) and a recessed surface 213a; if mating structure 210b comprises the step feature, then mating structure 210b comprises a contact surface 212b (dark area) and a recessed surface 213b; and if mating structure 210c comprises the step feature, then mating structure 210c comprises a contact surface 212c (dark area and a recessed surface 213c.

Figure 3B:
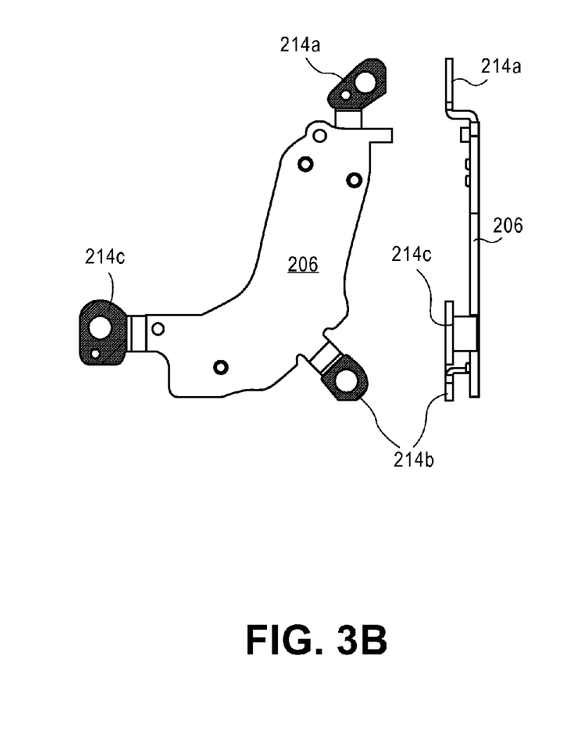
FIG. 3B is a plan view and side view illustrating a lower yoke of a VCM, according to an embodiment of the invention.

FIG. 3B is a plan view and side view illustrating a lower yoke of a VCM, according to an embodiment of the invention. Lower yoke 206 comprises a plurality of mating structures 214a, 214b, 214c. The number of mating structures constituent to tower yoke 206 may vary from implementation to implementation. Similarly as with upper yoke 202 and as described in reference to FIG. 3A, and according to an embodiment, one or more mating structure of lower yoke 206 may also or alternatively comprise the step feature d the corresponding contact surface and recessed surface, an embodiment which is described in more detail in reference to FIG. 6.

With reference to FIG. 3A(3) and according to an embodiment, illustrating an enlarged cutaway view A-A through mating structure 210c, mating structure 210c is shown to have a contact surface 212c and a recessed surface 213c. Similarly, with reference to FIG. 3A(4) and according to an embodiment, illustrating an enlarged cutaway view B-B through mating structure 210b, mating structure 210b is shown to have a contact surface 212b and a recessed surface 213b. With reference to FIG. 3A(3) and according to an embodiment, illustrating an enlarged cutaway view C-C through mating structure 210a, mating structure 210a is shown to have a contact surface 212a and a recessed surface 213a. When the upper yoke 202 and the lower yoke 206 are coupled together (see, e.g., FIG. 2(B)), each of the one or more contact surface 212a, 212b, 212c contacts a corresponding mating structure of the other yoke, and each of the one or more recessed surface 213a, 213b, 213c does not contact the corresponding mating structure of the other yoke.

Note that, according to an embodiment, the one or more contact surface 212a, 212b, 212c are positioned toward the outer perimeter of each respective mating structure 210a, 210b, 210c; and the one or more recessed surface 213a, 213b, 213c are positioned toward the inner portion of each respective mating structure 210a, 210b, 210c. Thus, contact between the upper yoke 202 and the lower yoke 206 is produced on the mating structure(s) outer region(s), which increases the effective beam length (distance between fixed ends/points) of the VCM assembly. Increasing the beam length of the upper yoke 202 and/or lower yoke 206, and of the assembly thereof, lengthens the natural wavelength and therefore reduces the natural frequency of the component and the assembly, thereby controlling or managing the resonance of the component and assembly, e.g., by reducing the resonance.

According to an embodiment, the step feature is positioned and fabricated such that it generally extends through the fastener hole (e.g., fastener hole 211a, 211b, 211c of FIG. 2) such that when upper yoke 202 and lower yoke 206 are attached with a fastener, for example a screw, then the area of the stepped mating structure around the fastener and fastener hole is part contact surface (outer) and part recessed surface (inner). This is depicted, for example, with reference to FIG. 3A(2) by showing the one or more contact surface 212a, 212b, 212c as the dark shaded region, generally extending across the centerline of the respective fastener hole (not shown here for clarity). Multiple configurations of the step feature were studied, for example, designs in which the outside ¾, ½, and ¼ of a mating structure are configured as the contact surface. The outside ¼ design showed the greatest reduction in frequency, however because the co act surface did not reach any part of the mating structure material immediately surrounding the fastener hole, there was only recessed surface and thus a gap between the upper and lower yokes across the entire cross-section of the fastener hole. Consequently, undesirable deformation of the yoke-yoke assembly occurred in the region of the fastener.

Figure 4:
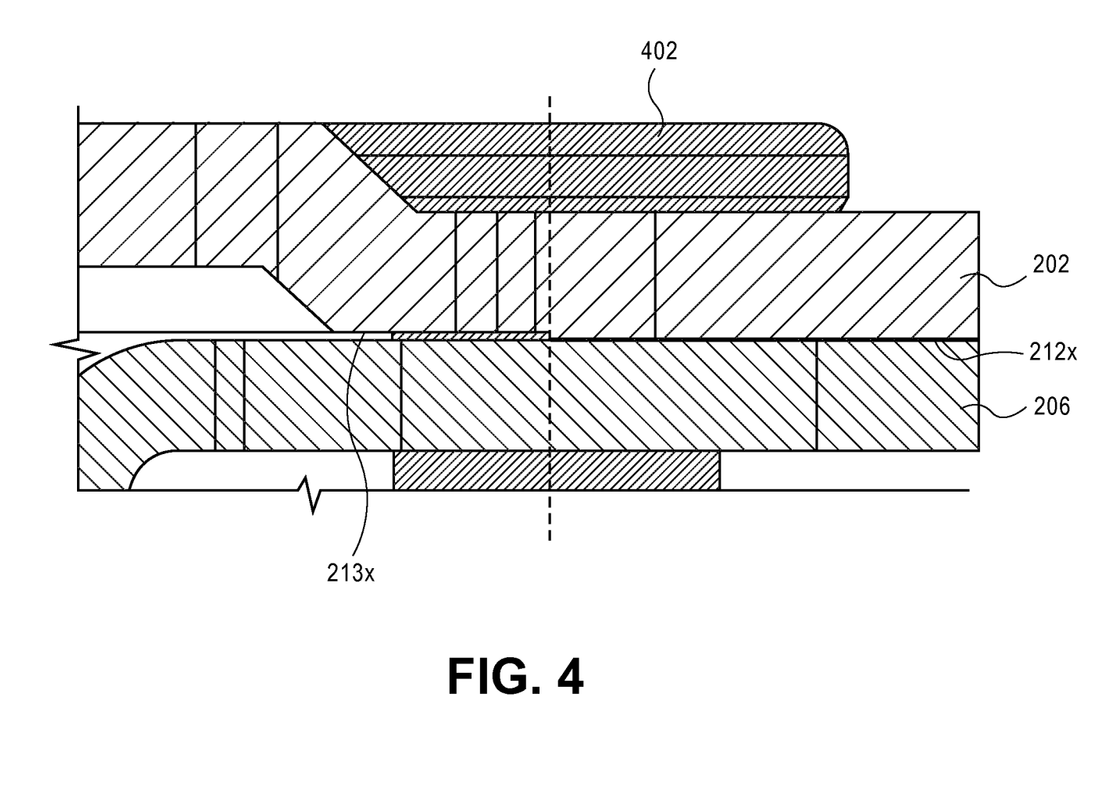
FIG. 4 is a side view illustrating an upper yoke-tower yoke assembly of a VCM, according to an embodiment of the invention.

FIG. 4 is a side view illustrating an upper yoke-lower yoke assembly of a VCM, according to an embodiment of the invention. FIG. 4 depicts an interface of an assembly of the upper yoke 202 and the lower yoke 206, with a fastener 402 assembling the two yokes together. In an embodiment, the fastener 402 is a screw. FIG. 4 shows an example of a contact surface 212x and a corresponding recessed surface 213x, wherein at the interface approximately ½ of the area around fastener 402 is made up of contact surface 212x and approximately ½ the area around fastener 402 is made up of recessed surface 213x. Therefore, the undesirable deformation is not likely to occur upon assembly because approximately ½ of the interface is fully physically in contact and thus supported at contact surface 212x whereas only ½ of the interface is not in physical contact and thus slightly unsupported at recessed surface 213x.

Figure 5:
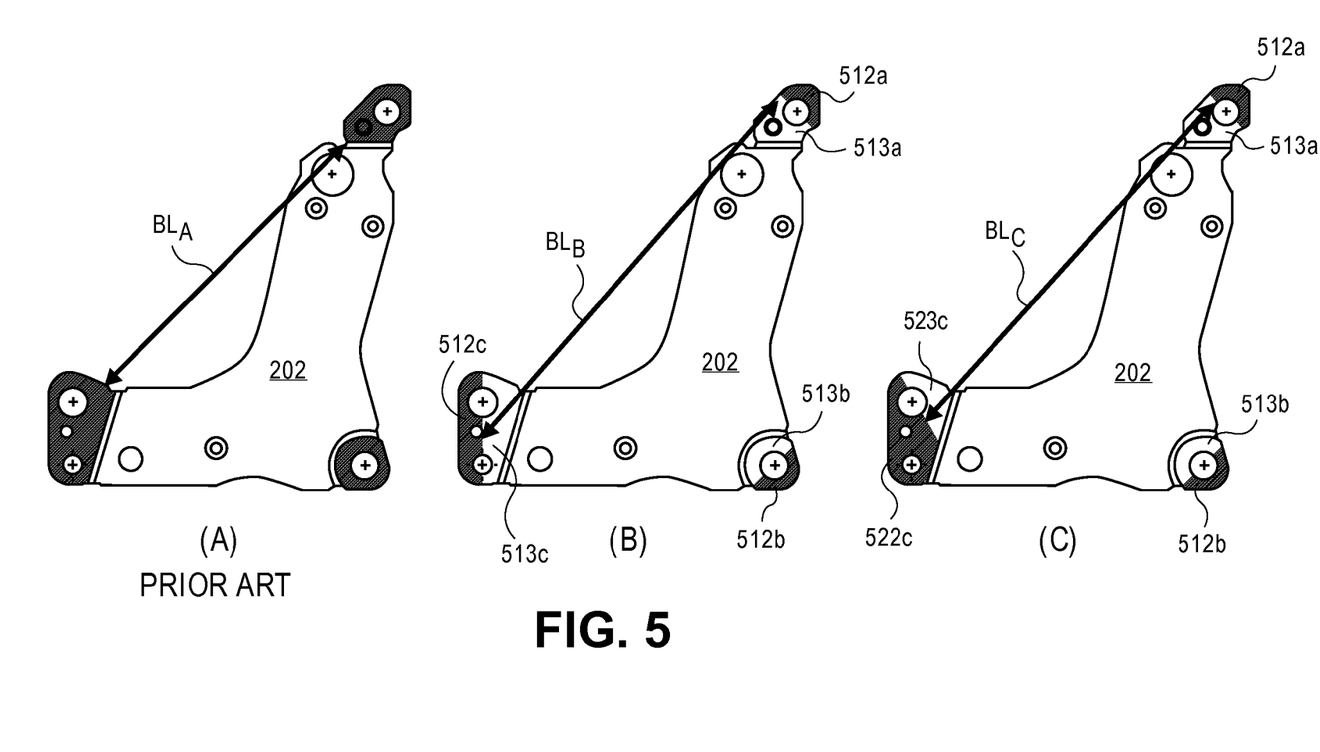
FIG. 5 (A), (B), (C) are each a bottom view illustrating an upper yoke of a VCM, according to an embodiment of the invention.

FIG. 5 (A), (B), (C) are each a bottom view illustrating an upper yoke of a VCM, (B) and (C) being according to an embodiment of the invention. FIG. 5(A) illustrates a prior art upper yoke 202, in which the entirety of each mating structure portion (dark areas) is substantially planar, i.e., there is no step feature and therefore no recessed surface. The prior art upper yoke 202 of FIG. 5(A) and a corresponding VCM assembly has a beam length (distance between fixed ends/points) labeled as $BL_A$.

FIG. 5(B) illustrates an upper yoke 202 according to an embodiment, in which each mating structure portion comprises the step feature and therefore has a contact surface 512a, 512b, 512x (dark areas) and a corresponding recessed surface 513a, 513b, 513c. Thus, upper yoke 202 of FIG. 5(B) has reduced-area contact surfaces and a corresponding VCM assembly has a beam length labeled as $BL_B$, where $BL_B$ is greater than $BL_A$. Similarly, FIG. 5(C) illustrates an upper yoke 202 according to an embodiment, in which each mating structure portion comprises the step feature and therefore has a contact surface 512a, 512b, 522c (dark areas) and a corresponding recessed surface 513a, 513b, 523c. Upper yoke 202 of FIG. 5(C) has reduced-area contact surfaces and a corresponding VCM assembly has a beam length labeled as $BL_C$, where $BL_C$ is greater than $BL_A$. As discussed, increasing the effective beam length of the upper yoke 202 and/or lower yoke 206, and of the assembly thereof, lengthens the natural wavelength and therefore reduces the natural frequency of the component and the assembly, thereby reducing the resonance, while maintaining the limited space (e.g., the footprint) that the VCM uses within a hard disk drive.

Figure 6:
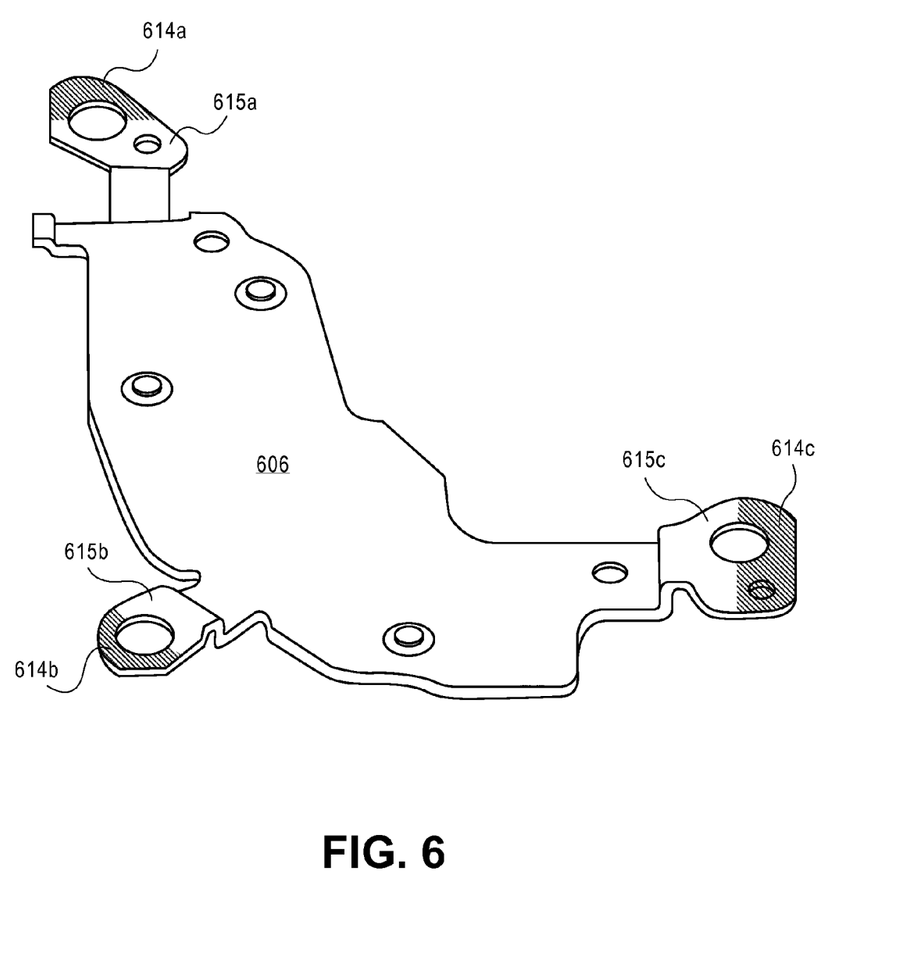
FIG. 6 is a perspective view illustrating a lower yoke of a VCM, according to an embodiment of the invention.

FIG. 6 is a perspective view illustrating a lower yoke of a VCM, according to an embodiment of the invention. As discussed and similarly as with upper yoke 202 as described in reference to FIG. 3A, one or ore mating structure of the lower yoke may also or may alternatively comprise the step feature and the corresponding contact surface and recessed surface. For example and as illustrated with lower yoke 606 of FIG. 6, lower yoke 606 comprises one or more contact surface 614a, 614b, 614c and corresponding recessed surface 615a, 615b, 615c. A lower yoke such as lower yoke 606 may be implemented with a known upper yoke such as upper yoke 202 of FIG. 5(A), or with any of the upper yoke embodiments described herein throughout, thereby producing similar results regarding reducing the frequency of, and thus managing the resonance of, tower yoke 606 and/or a corresponding VCM assembly of which lower yoke 606 is part.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A voice coil motor comprising:
a lower yoke having a plurality of mating structures;
a first magnet coupled with said lower yoke;
an upper yoke having a plurality of mating structures for attachment to said mating structures of said lower yoke;
a second magnet coupled with said upper yoke; and
wherein at least one mating structure of at least one of said yokes comprises a step feature that configures said at least one mating structure with a contact surface and a recessed surface, and wherein when said lower yoke and said upper yoke are attached said contact surface contacts a mating structure of the other yoke and said recessed surface does not contact said mating structure of said other yoke.

2. The voice coil motor of claim 1, further comprising:
a fastener that attaches said upper yoke to said lower yoke; and
wherein an area of said at least one mating structure around said fastener comprises part contact surface and part recessed surface.

3. The voice coil motor of claim 1, wherein said contact surface is toward an outer perimeter of and said recessed surface is toward an inner portion of said at least one mating structure.

4. The voice coil motor of claim 1, wherein said recessed surface is recessed from the plane of said contact surface.

5. The voice coil motor of claim 1, wherein said at least one mating structure comprises said plurality of mating structures of said at least one yoke.

6. The voice coil motor of claim 1, wherein said at least one yoke comprises said upper yoke.

7. The voice coil motor of claim 1, wherein said at least one yoke comprises said lower yoke.

8. The voice coil motor of claim 1, wherein at least one mating structure of said other yoke comprises a step feature that configures said at least one mating structure of said other yoke with a contact surface and a recessed surface, and wherein when said lower yoke and said upper yoke are attached said contact surface of said other yoke contacts a mating structure of said at least one yoke and said recessed surface does not contact said mating structure of said at least one yoke.

9. A hard disk drive (HDD), comprising:
a head slider comprising a magnetic write head;
an arm, with which said head slider is coupled;
a magnetic-recording disk rotatably mounted on a spindle; and
a voice coil motor (VCM) configured to move said arm and said head slider to access portions of said magnetic-recording disk, said VCM comprising:
a lower yoke having a plurality of mating structures,
a first magnet coupled with said lower yoke,
an upper yoke having a plurality of mating structures for attachment to said mating structures of said lower yoke,
a second magnet coupled with said upper yoke, and
wherein at least one mating structure of at least one of said yokes comprises a step feature that configures said at least one mating structure with a contact surface and a recessed surface, and wherein when said lower yoke and said upper yoke are attached said contact surface contacts a mating structure of the other yoke and said recessed surface does not contact said mating structure of said other yoke.

10. The HDD of claim 9, said VCM further comprising:
a fastener that attaches said upper yoke to said lower yoke; and
wherein an area of said at least one mating structure around said fastener comprises part contact surface and part recessed surface.

11. The HDD of claim 9, wherein said contact surface is toward an outer perimeter of and said recessed surface is toward an inner portion of said at least one mating structure.

12. The HDD of claim 9, wherein said at least one mating structure comprises said plurality of mating structures of said at least one yoke.

13. The voice coil motor of claim 9, wherein said at least one yoke comprises said upper yoke.

14. The HDD of claim 9, wherein said at least one yoke comprises said lower yoke.

15. The HDD of claim 9, wherein at least one mating structure of said other yoke comprises a step feature that configures said at least one mating structure of said other yoke with a contact surface and a recessed surface, and wherein when said lower yoke and said upper yoke are attached said contact surface of said other yoke contacts a mating structure of said at least one yoke and said recessed surface does not contact said mating structure of said at least one yoke.

16. A method of managing the resonance frequency of a hard disk drive voice coil motor (VCM) actuator comprising a lower yoke having a plurality of mating structures, a first magnet coupled to said lower yoke, an upper yoke having a plurality of mating structures for attachment to said mating structures of said lower yoke, and a second magnet coupled with said upper yoke, the method comprising:
fabricating a step feature on at least one mating structure of at least one of said yokes, configuring said at least one mating structure with a contact surface toward an outer perimeter of said at least one mating structure and a recessed surface toward an inner portion of said at least one mating structure; and
attaching said upper yoke to said lower yoke so that said contact surface contacts a mating structure of the other yoke and said recessed surface does not contact said mating structure of said other yoke.

17. The method of claim 16, wherein said attaching includes attaching said upper yoke to said lower yoke using a fastener so that the area of said at least one mating structure around said fastener comprises part contact surface and part recessed surface.

18. The method of claim 16, wherein said fabricating includes fabricating a step feature on said plurality of mating structures of said at least one yoke.

19. The method of claim 16, wherein said fabricating includes fabricating a step feature on said upper yoke.

20. The method of claim 16, wherein said fabricating includes fabricating a step feature on both of said upper yoke and said lower yoke.

* * * * *